Dec. 18, 1962
D. A. NEUBRECH ETAL
3,069,013
PHOTOELECTRIC INSPECTION SYSTEM
Filed May 18, 1960
7 Sheets-Sheet 1
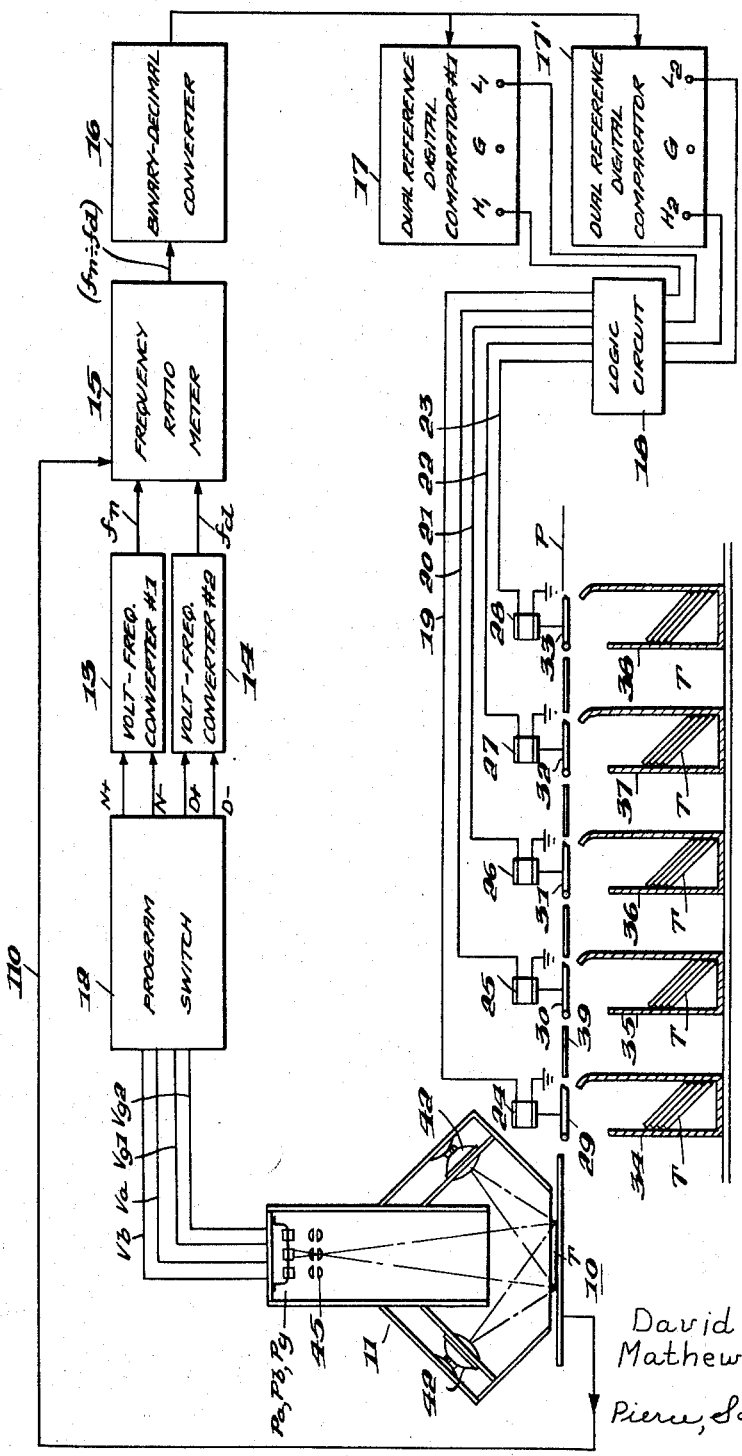
INVENTORS
David A. Neubrech
Mathew A. Cattaro
Pierce, Schiffler & Parker
ATTORNEYS Dec. 18, 1962  D. A. NEUBRECH ETAL  3,069,013
PHOTOELECTRIC INSPECTION SYSTEM
Filed May 18, 1960  7 Sheets-Sheet 2
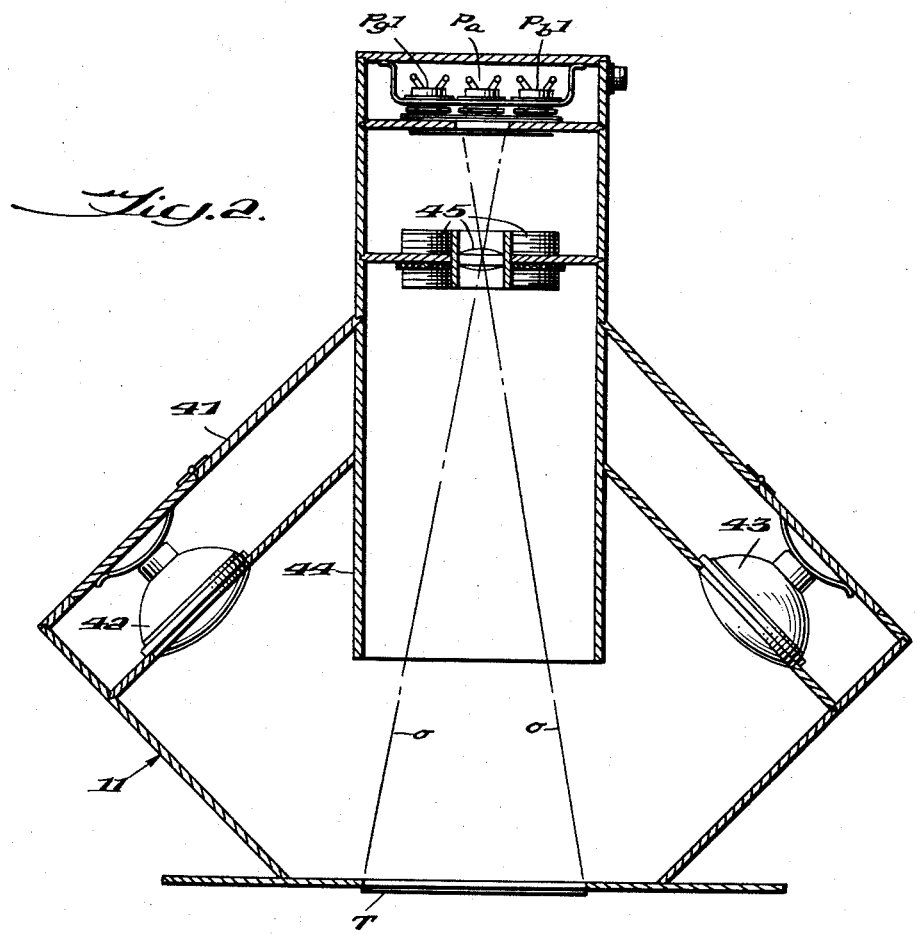
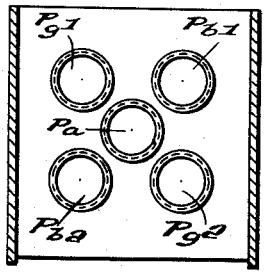
INVENTORS
David A. Neubrech
Mathew A. Cattaro
BY *Pierce, Scheffler & Parker*
ATTORNEYS

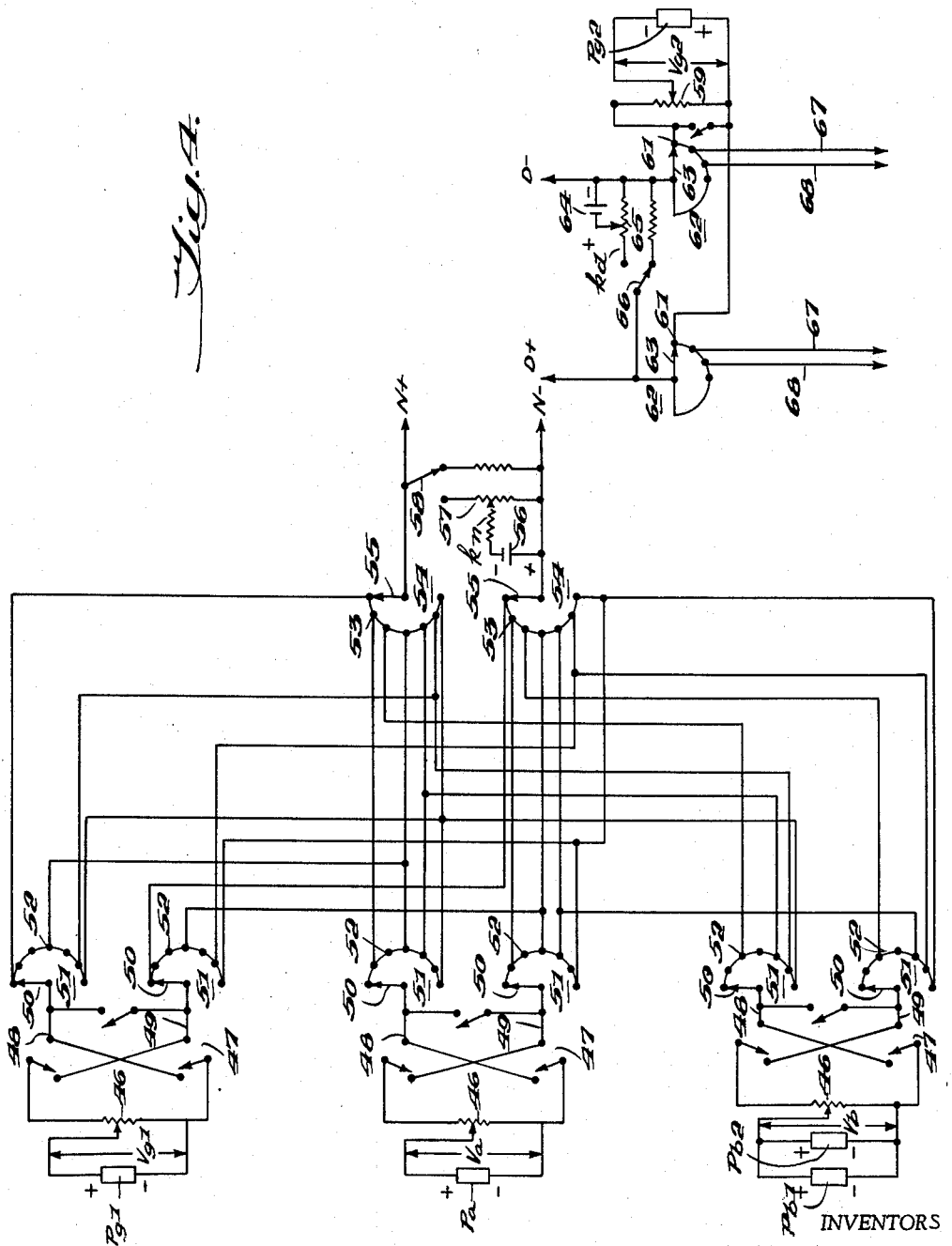

Dec. 18, 1962 D. A. NEUBRECH ETAL 3,069,013
PHOTOELECTRIC INSPECTION SYSTEM
Filed May 18, 1960 7 Sheets-Sheet 4

INVENTORS
David A. Neubrech
Matthew A. Cattaro
BY Pierce, Scheffler & Parker
ATTORNEYS INVENTORS
David A. Neubrech
Mathew A. Cattaro BY Pierce, Scheffler & Parker
ATTORNEYS United States Patent Office 3,069,013
Patented Dec. 18, 1962

3,069,013
PHOTOELECTRIC INSPECTION SYSTEM
David A. Neubrech, Takoma Park, Md., and Matthew A. Cattaro, Vienna, Va., assignors to Gardner Laboratory, Inc., Bethesda, Md., a corporation of Maryland
Filed May 18, 1960, Ser. No. 29,927
11 Claims. (Cl. 209—111.5)

The present invention relates to photoelectric controlled apparatus for inspecting material with respect to different colors or shades of colors and for converting the color or shade information picked up by the photoelectric elements into corresponding electrical quantities which can be used for recording or for sorting purposes.

One object of the invention is to provide apparatus of the class described which features a photoelectric inspection head provided with a plurality of photocells having different color filters and wherein each of the photocells views the same and a comparatively large area of the material undergoing inspection. Thus each color filtered photocell is enabled to average the particular color or shade established by the particular filter over the same and comparatively large area.

Another object of the invention is to provide an improved arrangement for evaluating shade or color in which the magnitude of a quantity which is representative of a particular shade or color is integrated with respect to a finite time so as to produce an average value which provides a more accurate determination of the shade or color.

Another object of the invention is to provide an improved system for color or shade evaluation having versatility which is made possible by a program switch by which the system can be quickly and easily changed over from one color or shade criterion to another.

Yet another object of the invention is to provide an improved system for color or shade evaluation wherein the voltage outputs from different color-filtered photocells are combined in a selected manner to produce an equation including a variable voltage numerator and also a variable voltage denominator, if desired, and wherein these voltages are converted into corresponding variable electrical frequencies and the ratio between the two then ascertained over a preselected period of time in order to obtain an average value which provides a more accurate result than that obtainable on a basis of using instantaneous values.

Still another object of the invention is to provide an improved system for evaluating color or shades which, except for the inclusion of mechanical relays in the output, has no moving parts.

Yet another object of the invention is to provide a more accurate determination of color or shades in which the result is obtained in a multi-digit resolution.

A further object of the invention is to provide an improved photoelectric apparatus for sorting articles as to color or shade, such as, for example, colored floor tiles made of asphalt, rubber or vinyl compositions and the like in such manner that all tiles having the same color or shade characteristics are sorted out into the same bin or other receptacle.

The sorting apparatus according to our invention includes an inspection station to which the tiles are presented in a consecutive manner, an inspection or viewing head at the inspection station which includes an assembly of photocells that functions to read the amplitudes of the various color components present over the entire area of the tile being viewed, a program switch for combining the voltage outputs of the various photocells into selected combinations so as to develop a selected equation involving a numerator voltage and sometimes also a denominator voltage, voltage-to-frequency converter units for converting the numerator and denominator voltages into corresponding frequencies, a ratio meter for determining the quotient between the numerator and denominator frequencies which is averaged over a predetermined period of time, and a comparator unit which compares this averaged quotient with a reference standard and produces one of a plurality of different output signals, each such signal connoting a specific difference or range of difference between the reference standard and the averaged quotient. The particular output signals are thus representative of different color or shade values for different tiles and are arranged to control the sorting mechanism such that all tiles of the same color or shade are channeled into the same bin or other receptacle.

An advantage of the sorting device according to the invention is that the program switch provides a quick and versatile arrangement for changing over the system from one color sort criterion to another. This is particularly important when the apparatus is required to sort tiles of various colors and shades, or combinations of colors and shades such as might be present in a spatter pattern.

Another advantage of the sorting system is that the components in the sorting system function in an improved manner so that the combination of the "reading" time required by the photocell assembly to evaluate the color of the tile or other article being sorted plus the "decision" time required by the electronic components to produce a sorting signal, i.e. the total time required to "read" and "command" is sufficiently averaged but yet is still very short, being of the order of a minimum of 0.280 sec. Thus the sorting machine is enabled to operate at a sorting speed of almost four per second and yet on a basis of averaged values.

The foregoing objects and advantages of the invention will become more apparent from the following description of a preferred embodiment of the invention as applied to a sorting apparatus in conjunction with the attached drawings, of which FIG. 1 is a schematic view showing the sorting system in accordance with one embodiment of the invention;

FIG. 2 is a view in vertical section of the inspection head incorporating the photocell assembly;

FIG. 3 is a plan view showing the spacial arrangement of the photocells;

FIG. 4 is a schematic electrical diagram of the program switch;

Figure 5:
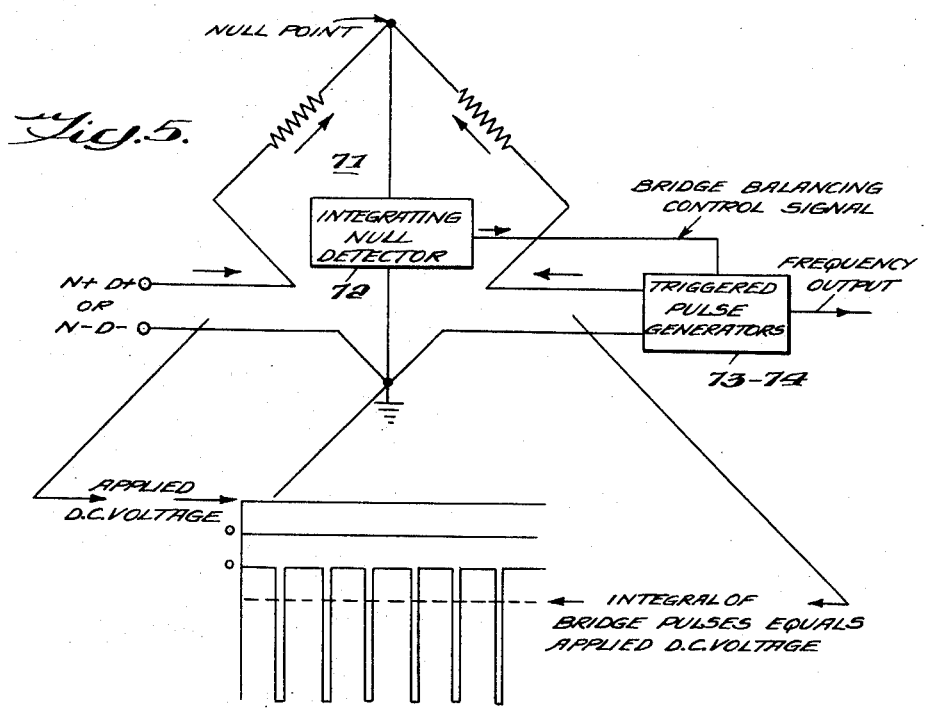
FIGS. 5 and 6 are schematic electrical diagrams of one of the two voltage-to-frequency converter units.

With reference now to FIG. 1, which shows the various units which make up the entire sorting system, an inspection station is indicated somewhat diagrammatically at 10 to which the articles to be sorted by color, for example, floor tiles T are presented in a successive manner by suitable delivery means, not shown in detail since various arrangements now known in the art of sorting can be used. An inspection head 11, shown in more detail in FIGS. 2 and 3, is located at the inspection station and functions by means of an assembly of variously color-filtered photocells of the photo-voltaic type to evaluate the average color or shade of each tile as it is presented to the inspection station for a predetermined dwell period. The various voltage outputs of the photocells are then passed to a program switch 12 which functions to combine these various outputs in selected combinations so as to develop a selected equation involving a variable numerator voltage and sometimes also a variable denominator voltage. However, for some combinations of the voltage outputs of the various photocells, the denominator may be a fixed, rather than a variable, voltage. The circuit details of the program switch are shown in FIG. 4 and will be described more particularly in a subsequent section of the specification.

The variable voltage output N+, N− from the program switch 12 representing the numerator is then passed to a voltage-to-frequency converter unit #1, designated 13 on the drawing, where the variable voltage is converted into a corresponding variable electrical frequency $f_n$. Similarly, the variable voltage output D+, D− from the program switch representing the denominator is then passed to a voltage-to-frequency converter unit #2, designated 14 on the drawing, where the variable voltage is converted into a corresponding variable electrical frequency $f_d$. However, as indicated, the particular equation selected by the program switch 12 may not include a variable denominator factor, in which case the voltage-to-frequency unit #2 would not be involved.

The variable frequency $f_n$, representing the variable numerator and the variable frequency $f_d$, representing the variable denominator, are then passed to a frequency ratio meter 15 which functions to obtain the ratio of the numerator to the denominator. The quotient, averaged with respect to time, in the form of a 4-2-2-1 binary code is then applied to a converter unit 16 which converts the binary code into a ten line decimal code. This decimal code is then applied to dual-range digital comparator units 17 and 17′ which function to compare this decimal output digit by digit with preset standard values so as to produce an electrical sort signal which is then passed back over one of the lines 19–23 to the appertaining electrically responsive device such as the solenoids 24–28 which then functions to trip open the associated door 29–33 so that the tile T, upon termination of the dwell period at the inspection station 10 will then be given a push along the rectilinear path P and drop into the associated bin 34–38. It will be seen that the bridge sections 39 located along the path P between adjacent doors provide for continued movement of the tile along the path until an open door is reached. It is to be understood, however, that the mechanical aspects of this part of the complete apparatus are not novel per se and may be departed from in other embodiments of the invention when used as a classifier.

*The Inspection Head*

The inspection head 11 is basically a photo-electric type of viewing device which is located at the inspection station 10 to which the articles to be sorted by color or shade are presented in a consecutive manner, each such article being stopped at the inspection station for a short dwell period sufficient to permit the various photocells of the photocell assembly to evaluate on an average basis the color or shade of each article and a sorting signal to be sent to and actuate the proper sorting unit.

The inspection head, as shown in FIGS. 2 and 3, is comprised of a sheet metal housing 41 in which are located two sources of illumination such as electric lamps 42, 43 mounted at an angle of 45° relative to the plane of the title T presented to the head, such article being, for example, a floor tile made from asphale, vinyl, rubber or the like. Light projected from the lamps onto the upper face of the tile is reflected upwardly through a tubular section 44 of the housing through lenses 45 onto the photocells themselves. Each photocell has its own lens. In the present embodiment an assembly of five such photocells are used, the photocells are of the photovoltaic type, and each photocell views the entire area of the tile T. The center positioned photocell of this assembly is provided with an amber filter and is designated P$a$. The upper right and lower left photocells, as viewed in FIG. 3 are provided with blue filters and are designated P$b$1 and P$b$2. The upper left and lower right photocells, as seen in this same view are provided with green filters and are designated P$g$1 and P$g$2. The two blue-filtered photocells are connected electrically in parallel. One of the green-filtered photocells P$g$1 is used in establishing the numerator, and the other green-filtered photo cell P$g$2 the denominator of an equation which will be later and more particularly described. The parallel connected blue-filtered photocells P$b$ and the amber filtered photocell P$a$ can also be used in establishing the numerator of this equation. The four voltage outputs from these various photocells are, namely, one voltage output V$b$ from the parallel connected blue-filtered photocells P$b$, a second voltage output V$a$ from the amber-filtered photocell P$a$, a third voltage output V$g$1 from the green-filtered photocell P$g$1 and a fourth voltage output V$g$2 from the other green-filtered photocell P$g$2. These four voltage outputs are then fed to the program switch 12 which is used to establish a particular desired relationship therebetween.

As previously explained, an important advantage in the improved photoelectric inspecting system is that each of the photocells views the entire area of the tile. Thus, with a tile measuring 9″ x 9″, the lens system, as indicated by the optic lines $o$, serves to focus the entire area of the tile on the entire area of the photocell. This relationship holds true for each of the photocells and is associated lens.

*The Program Switch*

The program switch as detailed in FIG. 4 takes the four voltage outputs from the photocells and establishes two voltages one of which is referred to as the numerator of an equation and the other the denominator of that equation. The program switch is so designed that the voltage representative of the numerator can be equal to any combination of ±V$b$, ±V$a$, ±V$g$1+a constant $k_n$. The voltage representative of the denominator, if used, can be V$g$2 or V$a$ or V$b$, each + a constant $k_d$. The purpose of using the constants $k_n$ and $k_d$, which are adjustable, is to make the variable voltage values at the outputs of the program switch as close as possible to a numerical value of one. A typical numerator established by the program switch would be $Va - Vb + k_n$. A typical denominator would be $Vg2 + k_d$.

If V$a$ or V$b$ are not used in the numerator, either one may be used in the denominator, with or without a constant.

As seen in FIG. 4 each of the voltage outputs from photocells P$g$1, P$a$ and P$b$ is applied through a potentiometer 46 individual thereto to a reversing switch 47, also individual thereto that functions to selectively reverse the polarity of the voltage applied to the two output leads 48, 49 which are connected respectively to the rotary contact members 50 of switches 51. Each one of these switches is provided with seven stationary contacts 52 and the stationary contacts of the various switches are interconnected as indicated and connected to stationary contacts 53 of two other switches 54. Connections to the rotary contact members 55 of these latter two switches establish the two output leads for the numerator voltage, and the voltage constant $k_n$ is added at this point by means of a source of voltage, represented by battery 56 and which is applied in an adjustable manner through a potentiometer 57 and switch 58. The two leads for the numerator are designated N+ and N−, respectively.

Also, as seen in FIG. 4 the voltage output V$g$2 from the other green-filtered photocell P$g$2 is applied through a potentiometer 59 to stationary contacts 61 of two other switches 62. The rotary contact members 63 of these latter two switches are connected to the two output leads for the denominator voltage, and the voltage constant $k_d$ is added at this point also by means of a source of voltage 64, represented by battery 64 and which is applied in an adjustable amount through a potentiometer 65 and switch 66. The two output leads for the denominator are designated D+ and D—, respectively.

Leads 67, 68 extend from other stationary contacts 61 on the two switches 62 to the rotary contacts of switches 51 associated with the output of photocells Pa and Pb in order that the respective outputs from these photocells may be substituted for Pg2 in the denominator.

The various photocells may be combined in various manners through the program switch 12 in order to establish any particularly desired criterion for sorting.

Basically, the output from the green-filtered photocell is indicative of the "lightness" factor of the tile. Similarly, the output from the blue-filtered photocell is indicative of the "brightness" factor of the tile. The difference between the outputs from the amber-filtered and blue-filtered photocells, i.e. $Va-Vb$ is indicative of the "yellowness" factor. The difference between the outputs from the amber-filtered and blue-filtered photocells divided by the output from the green-filtered photocell, i.e. $(Va-Vb) \div Vg$, is a measure of the "whiteness" factor. The difference between the outputs from the amber-filtered and green-filtered photocells, i.e. $Va-Vg$, corresponds to the "redness" factor. If this difference is positive, the color is towards the red. If this difference is negative, the color is towards the green. The difference between the outputs from the green-filtered and blue-filtered photocells i.e. $Vg-Vb$ is also a measure of the "yellowness" factor. If this difference is positive, the color is towards the yellow. If this difference is negative, the color is towards the blue.

Thus the switches 51, 54 and 62 can be set to establish any of these various combinations which may, or may not, include a denominator. Thus, the numerator may be a variable and the denominator a constant (value 1) in cases where there is no variable in the denominator. This would be true if the variable numerator represents $Va-Vb$, or $Va-Vg$, or $Vg-Vb$.

If it is desired to sort tile on a basis of relative "whiteness," the suitable equation as indicated above would be $Va-Vb \div Vg$, which is to say that relative "whiteness" would be ascertained by the "yellowness" factor divided by the "lightness" factor.

If it is desired to sort tiles on the basis of relative "greenness," the equation would be $Va-Vg$, using the negative resultants.

If it is desired to sort tiles on a basis of relative "redness," the equation would also be $Va-Vg$, using the positive resultants.

If it is desired to sort tiles on a basis of relative "yellowness," the equation would be $Vg-Vb$, using the positive resultants.

If it is desired to sort tiles on a basis of relative "blueness," the equation would also be $Vg-Vb$, using the negative resultants.

*Voltage-to-Frequency Converter*

As indicated in the overall schematic view in FIG. 1, the variable numerator voltage output from the program switch 12 at leads N+ and N— is now converted into a corresponding variable frequency by means of a voltage-to-frequency converter unit 13, and the variable denominator voltage output from this switch at leads D+ and D—, if there be a variable factor in the denominator, is similarly converted into a corresponding variable frequency by means of a second voltage-to-frequency converter unit 14.

Figure 6:
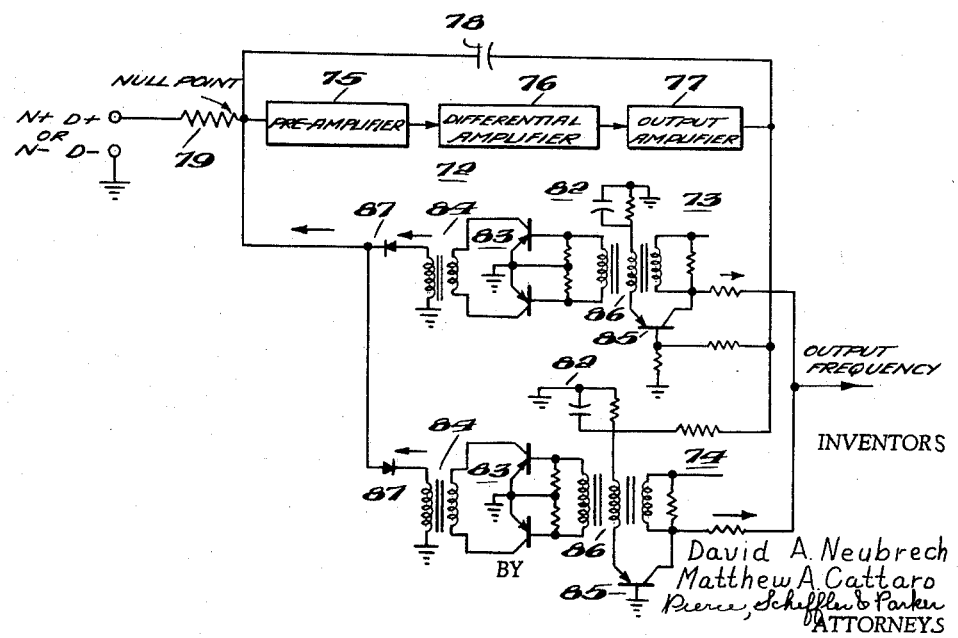

The voltage to frequency converter unit (13, 14) is a precision electronic transducer which converts the variable direct current (D.C.) input voltage at N+, N— or D+, D— into a corresponding frequency. As shown in the schematic diagrams of FIGS. 5 and 6, the converter is comprised of an electrical bridge 71, an integrating null detector 72 and two pulse generators 73, 74. When the D.C. input voltage to the bridge 71 is of one polarity, causing a temporary bridge unbalance in one direction, one of the pulse generators e.g. generator 73 is triggered by the output of the integrating null detector 72 to produce the output frequency. When the D.C. input voltage is of an opposite polarity, the other pulse generator 74 is triggered to produce the output frequency. Thus the frequency produced at the output is dependent only upon the amplitude of the D.C. voltage input and not its polarity.

The D.C. voltage input is applied to the bridge 71 where it is compared with the integral of a train of internally generated, standard pulses. Bridge balance is continuously monitored by the integrating null detector 72 connected across the bridge which, in turn, adjusts the pulse generation frequency, thus keeping the bridge exactly in balance. When the input voltage is zero, no pulses are generated and the bridge is balanced. When a D.C. voltage is applied to the input, it tends to unbalance the bridge. The integrating null detector integrates the unbalance, and triggers the appropriate positive or negative pulse generator. The latter produces an output standard pulse with a precise voltage-time integral of a polarity opposite to that of the input voltage. This standard pulse is applied to the bridge to restore the same to balance. The process is a continuous one, in which the integrating null detector adjusts the rate of pulse generation so that the time integral of the input voltage is exactly balanced by the time integral of the train of standard pulses. Since the time integral of the standard pulses is precisely fixed, pulse generation frequency is maintained proportional to the input voltage. This frequency is brought out for measurement at the output leads. For an input voltage range of 0–50 millivolts, the corresponding frequency range is 0–10 kc.

The integrating null detector consists of a chopper-stabilized amplifier with an external feedback loop. The amplifier consists of a low-frequency pre-amplifier stage 75, two cascaded differential amplifier stages 76 and an output cathode follower amplifier stage 77. The inherent gain of this amplifier is so high that the feedback loop alone determines its operation. The feedback element is a capacitor 78 which, together with the series input resistance 79, causes the null detector to integrate its input with respect to time. When a positive voltage, for example, is applied to the input, current is caused to flow through the input series resistance 79 and raise the D.C. voltage at the amplifier input. This lowers the voltage at the output of the amplifier. The change in output voltage causes current to flow through feedback capacitor 78 around the amplifier and oppose the change in voltage at the input. This current charges the capacitor, building up a voltage across the same. Since the amplifier gain is extremely high, a very small change in input voltage causes a very large change in output current. Therefore, the voltage at the input stays very near to ground potential. The current through the capacitor is directly proportional to the voltage applied to the input of the null detector 72, and the voltage developed across the capacitor (and at the amplifier output) is directly proportional to the charge on the capacitor. Since the charge on the capacitor is the integral of the current with respect to time, the voltage at the output of the amplifier is directly proportional to the integral of the input voltage.

As explained above, one triggered pulse generator is provided for positive inputs and a second such generator is provided for negative inputs. Except for the method of triggering, and their output signal polarity, the two pulse generators are identical. Each generator, which is transistorized, consists of a blocking oscillator 82, and a push-pull limiting amplifier 83 that drives a saturable core transformer 84. With a zero voltage input, the output of the null detector is very nearly zero. The base-to-emitter voltage of the blocking oscillator transistor 85 is therefore zero, and the transistor is cut off.

When a positive voltage is applied to the input, the null detector output voltage decreases, applying a forward bias current to the base of the transistor 85. When current flows from the emitter to the collector, the collector current is coupled back to the emitter through the current transformer 86, and the blocking oscillator fires. The collector is coupled to the output thus bringing out the frequency to be counted.

A third winding on the current transformer 86 drives the push-pull limiting amplifier 83. The output transformer 84 of this amplifier has a saturable core. When the blocking oscillator 82 fires, this transformer saturates, first in one direction, and then in the other, producing an output signal with a uniform voltage-time integral. A crystal diode 87 polarizes this output signal. That is, a positive triggered pulse generator produces negative output pulses; the negative triggered pulse generator produces positive pulses. These output pulses are applied to the bridge and their voltage-time integral is compared with that of the input voltage.

*Frequency Ratio Meter*

The next unit in the system is the frequency ratio meter 15 which functions to determine the ratio between the variable outputs of the two voltage-to-frequency converter units 13 and 14. If there is a variable output from only one of the voltage-to-frequency converters, such as the converter 13 representing only a numerator, the denominator then being a constant, i.e. unity, the frequency ratio meter then functions to determine the ratio between this single variable frequency input and a reference, constant unit of time which may be selected.

The frequency ratio meter measures the number of cycles arriving at input "A" (which is the output frequency of the voltage-to-frequency converter 13 that corresponds to the numerator in a particular equation set up on the program switch unit) for a predetermined number of cycles arriving at input "B" (which is the output frequency of the voltage-to-frequency converter 14 that corresponds to the denominator in the aforesaid equation. This is then the equivalent to measuring the ratio of input "A" to input "B" multiplied by the number of cycles of "B" during which "A" is counted. Input "B" is taken as the time base and hence the displayed count will be in terms of events per unit of time, the unit of time being determined by the multipliers. In other words, the count will be in terms of units of "A" per unit time at "B."

Figure 7:
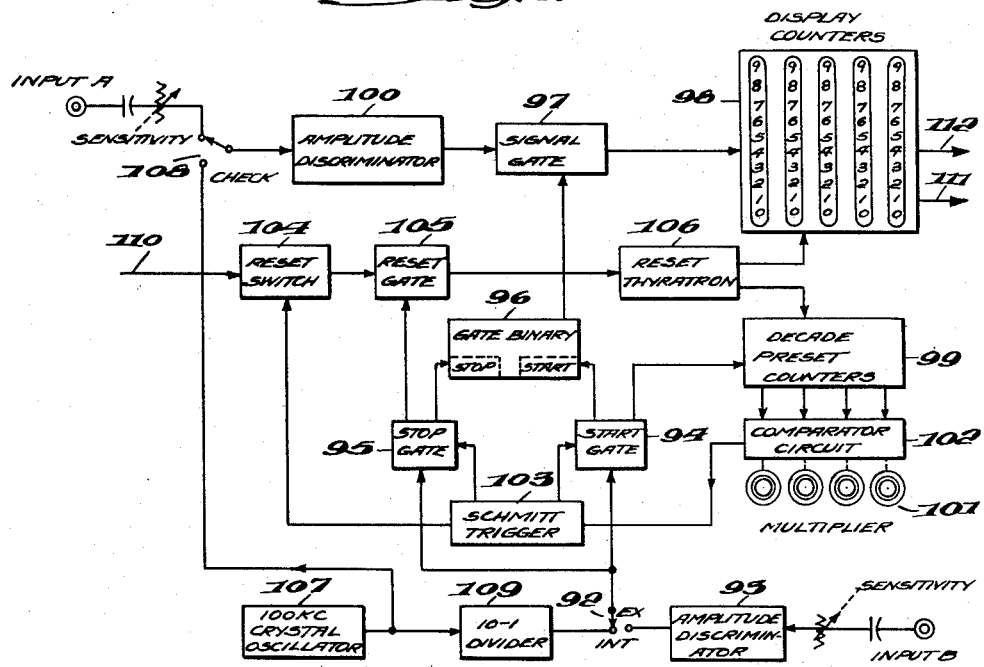
FIG. 7 is a block schematic electrical diagram of the frequency ratio meter.

A block schematic of the ratio meter unit is shown in FIG. 7. With reference to this figure, with switch 92 in the "Ext." position, the frequency input "B" is applied through an amplitude discriminator 93 to the inputs of a start gate 94 and a stop gate 95 in a simultaneous manner. Assume for the purpose of explanation that the start gate 94 has just opened. The next pulse appearing at the input of this gate is then allowed to pass through the gate to the start input of a gate binary 96. This pulse triggers the gate binary into its "start" state. The gate binary will remain in this state until a pulse arrives at the stop input, regardless of further pulses at the start input. When the gate binary is in the "start" state, it supplies a voltage to a signal gate 97 such that this gate is held open. The display counters 98 then count the pulses arriving from input "A" through the amplitude discriminator 100 and the signal gate 97.

The display counters unit 98 which will be later described in more detail tabulates the pulse input according to a 4-2-2-1 binary code and converts the latter into a multi digit decimal readout of the ratio which appears on the face of the unit. This visual decimal readout is not essential to the sorting function of the system but it is required for the purpose of standardizing the ratio unit. The 4-2-2-1 binary code established in the display counters unit is taken out to converter 16 which converts it from a binary to a decimal code as a step in producing the sort signal.

Pulses from the time base (input "B") continue to pass through the start gate 94 as long as it remains open. Only the first of these affects the gate binary 96, but these pulses are also supplied to the input of the decade preset counters unit 99, which continuously counts the time base from the instant the start gate opens.

This condition (display counters 98 counting pulse input "A" and decade preset counters 99 counting the time base pulse input "B" persists for example 0.1 sec. until the preset counters reach a count which has been preset on the multiplier dials 101. At this time, the comparator circuit 102 registers coincidence of the count set on the multiplier dials 101 with the count in the preset counters 99. This circuit then supplies a positive, step voltage to a Schmitt trigger 103 which causes the Schmitt circuit to change to its other stable condition, in which the start gate 94 is closed and the stop gate 95 is opened. When the start gate is closed, pulses are no longer supplied to the input of the preset counters 99, and these remain at the count set on the multiplier dials 101.

As the Schmitt trigger 103 changes state, it supplies a positive pulse to a reset switch 104 which is then triggered into a condition holding the reset gate 105 closed.

Since the stop gate 95 has been opened, the next pulse from the time base (input "B"), after the preset counters have reached the desired count, is applied to the stop input of the gate binary 96. This pulse causes the binary to change to its "stop" state in which the signal gate 97 is held closed, and the display counters 98 no longer count, but display the count accumulated as of the closing of the gate.

When the stop gate 95 is open, pulses are also supplied to the input of the reset gate 105. However, as previously explained, the reset gate 105 has been closed by the positive pulse from the Schmitt trigger 103 to the reset switch 104, and this condition, namely, display counter unit 98 tabulating and indicating some count, and preset counters 99 at the predetermined count, persists until the reset switch 104 is triggered into its other position thus opening the reset gate 105, and the next pulse from the time base input (input "B") passes through and triggers the reset thyratron 106 which resets both the display counters unit 98 and the preset counters unit 99 to zero.

When the preset counters 99 are reset, the comparators 102 no longer register coincidence. Therefore, the voltage they supply to the Schmitt trigger 103 drops, and the trigger changes to its original state in which the start gate 94 is open and the stop gate 95 is closed. The cycle of operations now repeats as described above.

The pulse for periodically triggering the reset switch 104 to open the reset gate 105 is obtained over line 110 from the inspection station in relation to the periodic presentation of the tiles or other articles to the inspection head 11 for color evaluation. Thus, each time an article T is presented to the inspection head, a pulse is sent over line 110 and the reset gate will be opened to condition the ratio meter for counting the inputs thereto and determining the ratio therebetween.

The signal gate 97 in the ratio meter may require, for example, a very short time, e.g. a minimum of 0.1 sec. to count. After this, there must be allowed a further short minimum "decision" time, for example 0.180 sec., for the count to be evaluated in the following digital comparator unit 17 which will be later described, and for the proper sort signal produced by the same to actuate the sorting device such that the article which has been evaluated will then be deposited in the proper compartment representative of its particular color value. Thus, for example, an article to be evaluated will require only a very brief dwell period e.g. 0.280 sec. at the inspection head after which it is passed to its proper sorting station.

It is to be noted that even though the frequency count is taken over a very short time, it results in an accurate measure of the color or shade since the color or shade reading is averaged over this period of time, as distinguished from a less accurate mode of reading the color or shade photoelectrically in terms of instantaneous values of the voltages produced by the viewing photocells. An even more accurate reading could, of course, be obtained by setting the ratio meter to integrate the number of incoming cycles over a longer period of time, but the inspection period, as a practical matter, must be kept reasonably short in the interest of maintaining a satisfactorily fast inspection rate.

If the components of the system according to the invention are not used for actually sorting out but rather are adapted for reading the average color or shade value of a strip of colored material being moved past the inspection head in a continuous manner, then the ratio meter can be set for any desired length of time and will average the reading of the color or shade of the strip for a length thereof which passes the inspection head during the time set on the ratio meter. In such an application, the reference digital comparator units 17, 17' and the sorting units controlled by them would not be necessary.

For purposes of calibrating the ratio meter 15, it is provided with a 100 kc. crystal oscillator 107 which serves to take the place of input "A" when switch 108 is shifted to the "check" position. The output of this oscillator is also taken through a 10–1 divider unit 109 and applied as the time base, in lieu of input "B," to the start and stop gates 94 and 95 when switch 92 is shifted to the "Int." position. Thus, the time base becomes 10 kc.

When the equation set up by the program switch 12 does not include a variable denominator factor there will be no variable frequency output from the voltage-to-frequency converter unit 14. The time base then becomes a constant so that under these conditions there is no variable frequency input to input "B." Under these conditions, switch 92 is then shifted to the "Int." position whereupon the constant time base is established by the 100 kc. crystal oscillator as it appears at the output of the 10–1 divider 109. Thus, the time base is a constant of 10 kc. and the ratio meter then measures the variable number of cycles entering at input "A" for this fixed number of cycles.

The amplitude discriminators 93, 100 each consists of a differential amplifier followed by a bi-stable multivibrator or flip-flop. These units are used as wave shapers to provide uniform pulses to operate the gate circuits and drive the decade counters of the decimal display unit 98. The input is applied to one grid of the differential amplifier and the other grid is grounded. Because of a common cathode resistor for both triode sections of the differential amplifier tube, any input will produce approximately equal and opposite effects on the two anode elements of these triode sections. The flip-flop has two stable states, either the left or right section of the two-section tube being conductive while the other section of this tube remains at cut-off. The circuit will remain in either stable state until driven to the switching point by the differential amplifier. At this instant, the conduction will switch rapidly, producing the steep wavefront at the output. A positive input, of sufficient amplitude, to the differential amplifier will cause the right half of the flip-flop to conduct and cut off the left half. The circuit will remain in this condition until the input voltage is decreased to a critical value where the conduction in the flip-flop will switch rapidly.

The start gate 94, stop gate 95 and signal gate 97 are of the dual-control pentode type. The dual-control pentode gate is basically a simple pentode amplifier stage whose control grid is biased beyond cut-off. It will therefore accept and amplify only positive pulses. It differs from a normal pentode in that the number three grid has considerable control of the current to the plate. If a negative gate signal is applied to the number three grid, all current to the plate can be cut off, and no output signal is present. If the gate signal allows the number three grid to approach cathode potential, the tube operates as a normal pentode, and amplified negative pulses appear at the output.

The reset gate 105 is a double triode gate. The input is applied to the control grid of a first half of this tube which is operated at nearly zero bias and is therefore most useful for negative pulse inputs. If the gate signal at the control grid of the second half of this tube is highly negative so that this latter tube half is cut off, the first half will supply large positive pulses at the output. If the gate signal at the control grid of the second tube half is positive, this half of the tube will conduct heavily, and presents a low shunt impedance around the first half of the tube. The first tube half therefore has very little effect on the output of the circuit, and only a very small signal will appear at the output.

The purpose of the Schmitt trigger 103 is to improve the rise time of the step-function output of the comparator circuit, and to supply standard voltages to control the start and stop gates 94 and 95. It is a characteristic of the Schmitt circuit that the tube will reverse conducting sections when the input voltage rises beyond a given point, and again when the input drops below a slightly lower point. The difference in trigger levels is due to the inherent hysteresis effect of the circuit, and is small enough to be neglected. As is well known, the Schmitt trigger includes a dual triode. A positive-going step of the output of the comparator unit applied to the control grid of a first section of this tube causes this section to conduct with an associated drop of voltage at the anode of this section, and a rise in cathode voltage. The change in anode voltage is transmitted to the control grid of the second section of this tube through a condenser and resistor divider. The cathode voltage change is direct-coupled. Both of these changes tend to cut off the second section of the tube the anode voltage of which rises. The tube will remain in this condition until the negative-going step of the output of comparator unit 102 crosses the trigger level and the process is reversed.

As explained above, the gate binary unit 96 controls the opening and closing of the signal gate 97. It is comprised of a dual triode with two stable states. A first section of the tube conducts while the second section is cut off, and vice versa. When a negative impulse arrives at the start input, i.e. at the control grid of a first section of this tube, the tube is triggered into the state in which this first section is cut off and the second section conducts. The voltage at the anode of the first section, which is connected to the signal gate, is then high, and the gate is open. When a negative pulse arrives at the stop input, i.e. the input applied to the control grid of the second section, the state of the circuit reverses, the voltage at the anode of the first section drops, and he signal gate 97 is held closed.

The reset thyratron unit 106 serves to reset the display counter unit 98 and preset counter unit 99 to zero. When a time base pulse passes through the reset gate 105, it appears as a positive pulse at the grid of the thyratron tube. This pulse fires the thyraton, and the discharge of a capacitor in the anode circuit thereof produces a positive pulse across a cathode resistor. As soon as this capacitor has discharged, the thyratron tube clears, as there is not enough steady-state current flow to maintain ionization. The positive pulse goes directly to the reset circuit of all the decades in the display counter unit 98.

The display counter 98 is of the decade type operating electronically on the basis of pulse inputs. The counter depicted in FIG. 7 has five decades connected in cascade. Each decade counts electrical pulses applied to its input terminals and indicates the number of the last pulse received in a column of lamp illuminated numerals on the front panel, reading upward from "0" to "9." Each decade unit produces one output pulse each time the registered counts step from "9" to "0" to start the count of the next adjacent decade unit. Each decade unit includes four bi-stable multivibrators or binaries connected in cascade so that the output from one is fed to the next adjacent binary, etc. The state of the first binary of each decade unit determines whether an odd or even numbered numeral lamp will be lighted by applying one necessary voltage to the even lamps, or to the odd lamps. The other voltage is obtained as the difference-voltage existing across two specific halves of two difference binaries. As subsequent input pulses are received, the difference-voltage lighting the lamps proceds from one pair of binaries to the next, lighting subsequent lamps.

The preset decade counter unit 99 is similar in principle of operation to the display counter unit 98 described above except that it has no illuminated numerals.

The comparator circuit 102 has the function to continuously monitor the count accumulating in the preset decade counter unit, to compare this count with the count set on the multiplier dials 101, and to supply a signal to the Schmitt trigger 103 as soon as these two counts are equal. This is accomplished by means of dual triodes, there being one such dual tube for each decade to be monitored, and each dual tube being so arranged that conduction of one section of the tube is determined by the relation between the grid voltages of both sections. This grid voltage relationship is established by the counts themselves so that after the desired number of counts, the tube section will be cut off. The comparator dual triode tubes are interconnected so that all the anodes of one and the same section of each tube have a common resistor as the load. With this common anode load, all of the tube sections associated therewith must be cut off for the output voltage to rise high enough to operate the Schmitt trigger unit 103. If one such tube section remains conducting, it will effectively shunt the other with such a low impedance that they will have only a small effect on the anode voltage.

*Binary-to-Decimal Converter*

The binary-to-decimal converter 16 serves the function of converting the 4-2-2-1 binary output of the display counter 98 of FIG. 7 into a corresponding decimal output. It stores in self-holding relays, the information fed from each of the binary counting units of the display counter 98. The storage process (relay closures) requires less than 0.080 sec., thus permitting the display counter 98 to be operated at its fastest count repetition rate. The converter 16 receives from the display counter 98 two kinds of information, a read-command pulse when the display counter finishes its count and begins its display, and the actual display information from the binary counting units. The display information is carried by four lines from each decimal place, one for each binary in a binary counting unit. The converter includes a "command" circuit which initiates the transfer operations, relay assemblies in the form of decade registers which store the information from the display counter, and a power supply.

Figure 8:
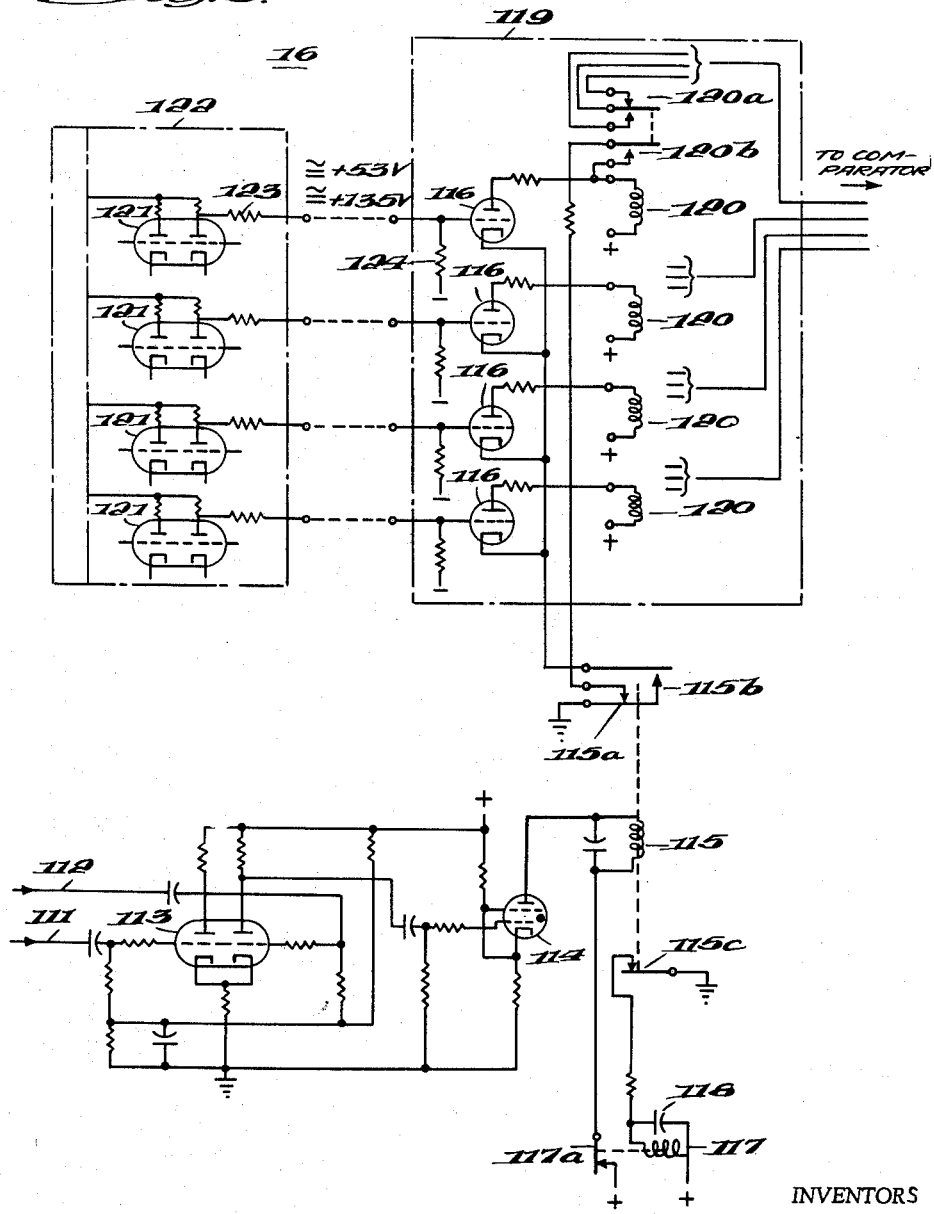
FIG. 8 is a schematic electrical diagram of the binary-to-decimal converter.

FIG. 8 shows the common control circuit for all of the decade register units together with the detailed circuit diagram of one of those register units and its related decade counter unit of the display counter 98.

With reference now to FIG. 8, a positive or negative read-command pulse received from the display counter 98 over line 111 or 112 respectively, is first amplified in a differential amplifier 113 which can receive either the positive or negative pulses and produces positive pulses to ionize a read-command thyratron 114. When thyratron 114 becomes ionized it causes energization of relay 115, the coil of the latter being connected in the anode circuit of this thyratron. Before being energized the closed contacts 115a of relay 115 serve to maintain holding contacts on the storage relays to store the previous counter information. As relay 115 becomes energized, it first closes contacts 115b which ground the cathodes of the binary reader triodes 116, there being one triode tube for each binary output in the decade registers, and secondly, it opens contacts 115a which open the holding contact circuits and permit all the storage relays 120 to assume their new positions as determined by the readers. Since less than twenty milliseconds are required for the readers to close the storage relays, relay 115 needs to remain energized only for this duration. To de-energize relay 115 after about fifty milliseconds, one of its contacts 115c which opens upon energization serves to de-energize a transfer relay 117, whose opening contacts 117a in turn de-energizes relay 115 by opening its holding circuit and extinguishes the thyratron 114. Due to the action of condenser 118, relay 117 opens slowly, permitting relay 115 to remain closed for about fifty milliseconds.

Each decade register unit 119 of the binary-decimal converter 16 has four relays 120 each of which is controlled by one of the triode reader tubes 116, these latter tubes being controlled respectively by the four binaries, double triodes 121 of each decade counter unit 122 of the display counter 98. Four binaries are required to produce digits from 0 to 9 in one decimal place in the counter. If a binary output voltage at any triode 121 is "up," its corresponding binary reader triode 116 conducts and energizes the associated storage relay 120. If the binary output voltage is "down," its corresponding reader triode does not conduct and the corresponding storage relay 120 is de-energized as relay 115 opens the holding contact circuit.

The output impedance of each binary 121 in the counter is about one megohm which is due to a series resistor 123. The binary's "up" and "down" voltages, +85 v. and +125 v., open circuit, are dropped in the voltage divider formed by the grid return resistor 124 of the reader 116, which returns to −80 v. D.C. The resultant "down" voltage applied to the reader 116 cuts this tube off; the resultant "up" voltage turns the reader tube on, but only during the period that relay contacts 115b ground the reader cathode. Each of the storage relays 120 has six sets of contacts, one of which is indicated at 120a. Relay contacts 120b are holding contacts. Each relay's operation repeats the up-down operation of its associated counter binary output voltage.

*Dual Reference Digital Comparator*

Figure 9:
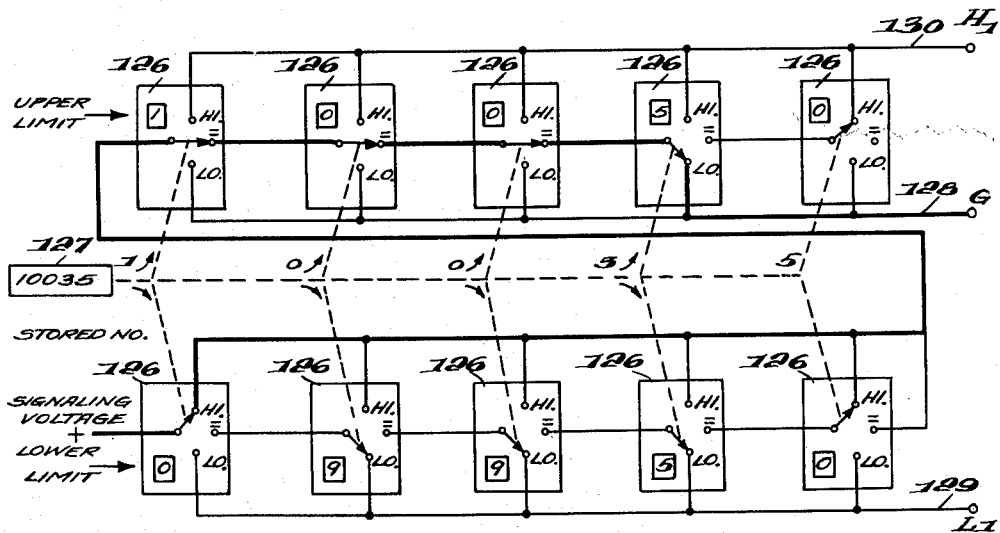
FIG. 9 is a block schematic diagram of the dual reference digital comparator unit.

The function of the dual reference digital comparator units 17 and 17', one of which is shown diagrammatically in FIG. 9, is to simultaneously compare digit-for-digit a number displayed on the counter unit 98 and which is stored in the relays 120 of the converter 16 with a number selected on the comparator unit. Each decimal place, represented by blocks 126, in a comparator unit has an identical comparison circuit; each consists of a series of wire jumpers. Each comparison circuit compares the counter digit against the selected comparator digit in a given decimal place by establishing a specific electrical path for an applied signaling voltage through a network of contact closures in the storage relays 120 of the binary-decimal converter unit 16 and in the comparator unit's jumper plugs or switches. Each digit has a different electrical path. If the two numbers are the same, the signaling voltage travels along that digit's established electrical path of contact closures to an output terminal legended "=" and thence to the next decimal place (block 126). If the counter's number is higher, the different settings of the storage relays 120 shift the established electrical path to a high bus. If the counter's number is lower, the different settings of the storage relays 120 shift the signaling voltage onto the low bus.

Since the number is composed of several decimal places, each decimal place in the counter is compared against each corresponding decimal place in the selected number in the same manner, and the established path for the signalling voltage is sequentially through each decimal place's comparator circuit (blocks 126), beginning with the most-significant figure and ending with the least-significant figure, as shown in FIG. 9. However, the moment the signaling voltage arrives at a comparator circuit in which the two numbers are not equal, the signaling voltage is diverted from the routing through the comparators 126 straight to the appropriate high or low bus; further comparison is not useful once the counter number diverts the established signaling path to a high bus or a low bus.

The counter's number, indicated in block 127, is compared to a range of numbers established between upper and lower limits. The counter number is first compared to the lower comparator number, and if equal or higher, the signaling voltage is passed through the established path of contact closures in the lower comparators to the upper comparators. If the counter number is equal to or lower than the upper comparator number, the signaling voltage is passed through the established path to the go bus 128. If the counter number is lower than the lower comparator number, the signaling voltage is diverted from the established path to the low bus 129. If the number is higher than the upper limit comparators, it is diverted to the high bus 130.

Thus, for example, if the selected upper limit number of the comparator 17 is 1.0050 and the selected lower limit number is 0.9950, and the actual number stored in the relays 120 is 1.0035, the selected path for the signaling voltage through the comparator units will be as indicated in heavy lines in FIG. 9 and the signaling voltage will be delivered to the go bus terminal G.

If the actual number is lower than 0.9950, then the signaling voltage will be delivered to the low bus terminal L1. If the actual number is higher than 1.0050, then the signaling voltage will be delivered to the high bus terminal H1.

Signaling voltages appearing respectively at terminals H1, G and L1 of the comparator 17 can be used to actuate the electrically responsive elements of a sorting mechanism thus producing three different sorts. If a larger number of sorts is desired, as is illustrated in the present embodiment, then use is made of the second digital comparaor 17' which produces a second high H2 and a second low L2, and a logic circuit 18 is then employed to determine whether the actual number is greater than H2 or lies somewhere between H1 and H2, or is less than L2, or lies somewhere between L1 and L2. The second comparator 17' is identical with comparator 17 and hence is not illustrated in detail.

With the setting of the comparator 17 as given above, the selected upper limit for the second comparator 17' could be, for example 1.0100 and the selected lower limit could be, for example, 0.9900. If the actual number were then to be above 1.0100, then the signaling voltage would appear at the high bus terminal H2 on comparator 17'. If the actual number is lower than 0.9900, then the signaling voltage would appear at the low bus terminal L2 on comparator 17'.

Should the actual number be greater than 1.0100, it will be evident that not only will a signaling voltage appear at high bus terminal H2 on comparator 17' but a signaling voltage will also appear at the high bus terminal H1 on comparator 17. Thus it becomes necessary to distinguish between H2 and H1. The same requirement exists should the actual number be less than 0.9900, for in that case a distinction must be made between L2 and L1 since a signaling voltage will appear at both of these terminals.

Figure 10:
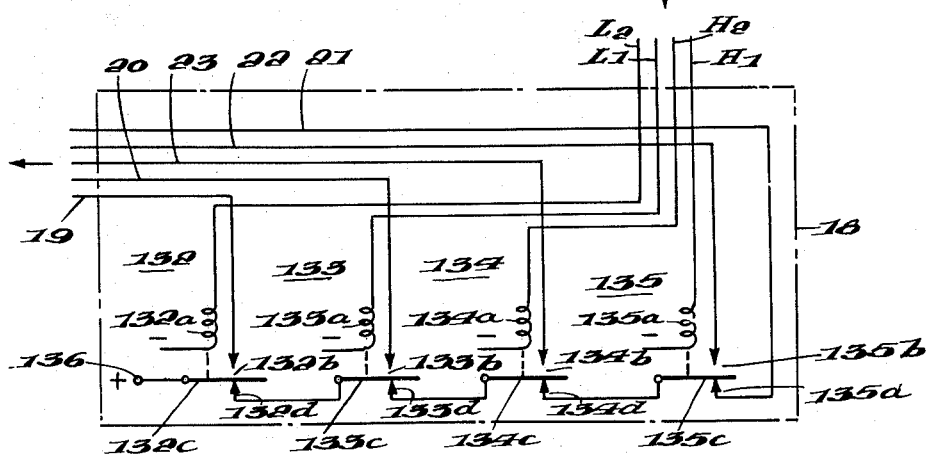
FIG. 10 is an electrical schematic diagram of the logic circuit at the output of the comparator unit.

The necessary distinction between H2 and H1, and between L2 and L1 is effected in the logic circuit 18 which is shown in FIG. 10. With reference now to FIG. 10, the logic circuit is seen to be comprised of four single pole, double throw relays 132, 133, 134 and 135. The energizing coil 132a of relay 132 is connected to terminal L2 of comparator 17' and coil 133a of relay 133 is connected to terminal L1 of comparator 17. Coil 134a of relay 134 is connected to terminal H2 of comparator 17' and coil 135a of relay 135 is connected to terminal H1 of comparator 17.

All of the relays 132–135 are shown in the de-energized positions, in which case the contact blades 132c–135c are engaged with relay contacts 132d–135d and a circuit is established from a terminal 136 to which the positive side of a voltage is applied through these contact blades and relay contacts in series.

Thus, with all of the relays in their de-energized positions, a circuit is established from the terminal 136 through the relays to line 21.

As previously explained, should the actual number lie somewhere between the upper and lower limit numbers selected on comparator 17, no signaling voltage will appear at either terminal H1 or L1 but a signaling voltage will appear at the G terminal. No signaling voltage will likewise appear at terminals H2 and L2 of comparator 17'. This G terminal on comparator 17 is not used, but the equivalent functional result is obtained in the logic circuit 18 since under these circumstances, none of the relays 132–135 will become energized, and the desired signaling voltage representative of a voltage at terminal G is then sent out from source terminal 136 in the logic circuit through the blades and stationary contacts of relays 132–135 in series to line 21 which, as shown in FIG. 1, connects with the energizing coil of sort relay 26 which is then actuated to cause door 31 to open and drop the tile T into receptable 36.

Should the actual number be less than the lower limit number selected on comparator 17', then the voltage appearing at terminal L2 will serve to energize relay coil 132a thus causing contact blade 132c to engage contact 132b and disengage from contact 132d. This serves to connect the source terminal 136 to line 19 which connects with the energizing coil of sort relay 24 which is then actuated to cause door 29 to open and drop the tile T into receptacle 34. In this case, a voltage will also appear at terminal L1 but is without effect so far as the sorting is concerned since the relay 133 which it controls follows relay 132 in the cascaded arrangement and hence even though its coil is energized, there will be no closed circuit to its contacts from the source terminal 136 as relay 132 becomes energized to open the circuit at contacts 132c, 132d.

Should the actual number lie between the lower limit numbers selected on comparators 17 and 17', then the only signaling voltage which appears is that at terminal L1 and this serves to energize relay coil 133a thus connecting the source terminal 136 through now closed relay contacts 133b, 133c to line 20 which connects with the energizing coil or sort relay 25 which is then actuated to cause door 30 to open and drop the tile into receptacle 35.

Should the actual number lie between the upper limit numbers selected on comparators 17 and 17', then the only signaling voltage which appears is that at terminal H1 and this serves to energize relay coil 135a thus connecting the source terminal 136 through the blade and stationary contacts of relays 132–134 to the blade contact 135c which now engages contact 135b. Source terminal 136 is thus connected to line 22 which connects with the energizing coil of sort relay 27 which is then actuated to open door 32 and drop the tile into receptacle 37.

Should the actual number be greater than the upper limit number selected on comparator 17', then a signaling voltage appears at terminal H2 and this serves to energize relay coil 134a thus connecting source terminal 136 through the blade and stationary contacts of relays 132 and 133 to the blade contact 134c which now engages contact 134b. Source terminal 136 is thus connected to line 23 which connects with the energizing coil of sort relay 28 which is then actuated to open door 33 and drop the tile into receptacle 38. In this case, a voltage will also appear at terminal H1 but is without effect so far as the sorting is concerned since the relay 135 which it controls follows relay 134 in the cascaded arrangement and hence even though its coil is energized, there will be no closed circuit to its contacts from the source terminal 136 as relay 134 becomes energized to open the circuit at contacts 134c, 134d.

After the proper door has been opened and the tile T passed along path P at the end of the dwell period so as to drop into its proper receptacle, the next tile to be color or shade evaluated is presented to the inspection station 10 whereupon a new pulse is transmitted over line 110 from the station to ratio meter 15 which serves to once again trigger reset switch 104 to open reset gate 105 to condition the ratio meter for counting the numerator and denominator frequency inputs thereto and for determining the ratio therebetween averaged over the time period selected, so that the color or shade of the tile as viewed by the photocell assembly is likewise averaged over such period.

In conclusion it is desired to point out that while one specific embodiment of the invention has been described and illustrated, various modifications in the construction and arrangement of the components may be adopted without, however, departing from the spirit and scope of the invention as defined in the appended claims.

We claim:

1. In a photoelectric inspection device for evaluating the color of an article, a plurality of light-sensitive cells uniformly spaced from the surface of the article to be inspected, a color filter for each light-sensitive cell, the filters for different light-sensitive cells being of different colors, a lens individual to each light-sensitive cell and arranged between said cell and the article surface, and a source of light directed onto the article surface and reflected therefrom through said lenses and filters to said light-sensitive cells, the optics of the light paths from the article surface through said lenses to the corresponding light-sensitive cells being such that light reflected from each and every portion of the same and comparatively large area of said surface is focussed uniformly over the sensitive area of each of said light-sensitive cells.

2. In a photoelectric inspection device for evaluating the color of an article, a casing, a plurality of light-sensitive cells grouped in a co-planar arrangement and mounted in said casing parallel with and spaced from the surface of the article to be inspected, a color filter for each light-sensitive cell, the filters for different light-sensitive cells being of different colors, a plurality of lenses grouped together in a co-planar arrangement and mounted in said casing parallel with said group of light-sensitive cells, and a source of light mounted within said casing such that the light therefrom is directed onto the surface of the article to be inspected and reflected therefrom through said lenses and filters to said light-sensitive cells, the optics of the light paths from the article surface through said lenses to the corresponding light-sensitive cells being such that light reflected from each and every portion of the same and comparatively large area of said surface is focussed uniformly over the sensitive area of each of said light-sensitive cells.

3. In a photoelectric inspection device for evaluating the color of an article, the combination comprising an inspection head having a plurality of light-sensitive cells provided respectively with color filters of different color characteristics, a light source directing light therefrom onto the surface of the article to be inspected and which is reflected from said surface onto each of said color filtered light-sensitive cells, a program switch for selectively combining the outputs from said light-sensitive cells to form a resultant output, and means averaging said output for a preselected period.

4. A photoelectric inspection device as defined in claim 3 wherein said output averaging means comprises means converting said output into a corresponding electrical frequency variable with the amplitude of the output and means integrating said variable frequency with respect to time.

5. In a photoelectric inspection device for evaluating the color of an article, the combination comprising an inspection head having a plurality of photocells of the photo-voltaic type provided respectively with color filters of different color characteristics, a light source directing light therefrom onto the surface of the article to be inspected and which is reflected from said surface onto each of said color filtered photocells, a program switch for selectively combining the respective output voltages of said photocells to form a resultant voltage, and means averaging said resultant voltage for a preselected period.

6. A photoelectric inspection device as defined in claim 5 wherein said averaging means for said resultant voltage comprises means converting said resultant voltage into a corresponding electrical frequency variable with the amplitude of said resultant voltage and means integrating said variable frequency with respect to time.

7. In a photoelectrically controlled device for sorting articles with respect to color, the combination comprising an inspection station to which the articles are presented in a sequential manner, an inspection head at said inspection station having a plurality of light-sensitive cells and which are provided with color filters of different color characteristics respectively, a light source directing light therefrom onto the surface of the article to be inspected and reflecting light from said surface into each of said light-sensitive cells, means selectively combining the outputs from said light-sensitive cells to establish a numerator output and a denominator output, means obtaining a numerical ratio between said numerator and denominator outputs averaged for a preselected period, means comparing said averaged ratio with a reference numerical limit value to obtain the difference therebetween, and a plurality of sorting units selectively actuated in accordance with the sense of said difference to correspondingly sort the articles according to their relatively different color values.

8. In a photoelectrically controlled device for sorting articles with respect to color, the combination comprising an inspection station to which the articles are presented in a sequential manner, an inspection head at said inspection station having a plurality of photocells of the photo-voltaic type and which are provided with color filters of different color characteristics respectively, a light source directing light therefrom onto the surface of the article to be inspected and reflecting light from said surface into each of said photocells, means selectively combining the voltage outputs of said photocells to establish a numerator voltage and a denominator voltage, means obtaining a numerical ratio between said numerator and denominator voltages averaged for a preselected period, means comparing said averaged ratio with a reference numerical limit value to obtain the difference therebetween, and a plurality of sorting units selectively actuated in accordance with the sense of said difference to correspondingly sort the articles according to their relatively different color values.

9. In a photoelectrically controlled device for sorting articles with respect to color, the combination comprising an inspection station to which the articles are presented in a sequential manner, an inspection head at said inspection station having a plurality of light-sensitive cells and which are provided with color filters of different color characteristics respectively, a light source directing light therefrom onto the surface of the article to be inspected and reflecting light from said surface into each of said light-sensitive cells, means selectively combining the outputs from said light-sensitive cells to form a resultant output, means obtaining a numerical value representing an average of said output for a preselected period, means comparing said numerical value with a reference numerical limit value to obtain the difference therebetween, and a plurality of sorting units selectively actuated in accordance with the sense of said difference to correspondingly sort the articles according to their relatively different color values.

10. In a photoelectrically controlled device for sorting articles with respect to color, the combination comprising an inspection station to which the articles are presented in a sequential manner, an inspection head at said inspection station having a plurality of light-sensitive cells provided with color filters of different color characteristics respectively, a light source directing light therefrom onto the surface of the article to be inspected and which is reflected from said surface into each of said color-filtered light-sensitive cells, a program switch for selectively combining the outputs from said light-sensitive cells to establish an electrical numerator quantity and an electrical denominator quantity, means converting said numerator and denominator quantities into corresponding electrical frequencies variable respectively with the amplitudes of said numerator and denominator quantities, means obtaining a numerical ratio between the number of cycles in said numerator and denominator frequencies totalized for a preselected period, means comparing said numerical ratio with a reference numerical limit value to obtain the difference therebetween, and a plurality of sorting units selectively actuated in accordance with the sense of said difference to correspondingly sort the articles according to their respectively different color values.

11. In a photoelectrically controlled device for sorting articles with respect to color, the combination comprising an inspection station to which the articles are presented in a sequential manner, an inspection head at said inspection station having a plurality of photocells of the photo-voltaic type provided with color filters of different color characteristics respectively, a light source directing light therefrom onto the surface of the article to be inspected and which is reflected from said surface into each of said color-filtered photocells, a program switch for selectively combining the output voltages from said photocells to establish a numerator voltage and a denominator voltage, means converting said numerator and denominator voltages into corresponding electrical frequencies variable respectively with the amplitudes of said numerator and denominator voltages, means obtaining a numerical ratio between the number of cycles in said numerator and denominator frequencies totalized for a preselected period, means comparing said numerical ratio with a reference numerical limit value to obtain the difference therebetween, and a plurality of sorting units selectively actuated in accordance with the sense of said difference to correspondingly sort the articles according to their respectively different color values.

References Cited in the file of this patent
UNITED STATES PATENTS

| | | |
|---|---|---|
| 2,382,439 | Osborn | Aug. 14, 1945 |
| 2,483,452 | Berkley | Oct. 4, 1949 |
| 2,625,265 | Cox | Jan. 13, 1953 |
| 2,696,750 | Hunter | Dec. 14, 1954 |
| 2,882,785 | Biesele | Apr. 21, 1959 |
| 2,898,801 | Rockafellow | Aug. 11, 1959 |
| 2,988,219 | Bartlett | June 13, 1961 |
| 3,004,702 | Kranz | Oct. 17, 1961 |